A. W. SHIRK.
SEWER AGITATOR.
APPLICATION FILED AUG. 25, 1913.

1,110,832.

Patented Sept. 15, 1914.

Witnesses

Inventor
Andrew W. Shirk
By R. J. McCarty
his Attorney

THE NORRIS PETERS CO., WASHINGTON, D. C.

UNITED STATES PATENT OFFICE.

ANDREW W. SHIRK, OF DAYTON, OHIO.

SEWER-AGITATOR.

1,110,832.     Specification of Letters Patent.     Patented Sept. 15, 1914.

Application filed August 25, 1913. Serial No. 786,610.

*To all whom it may concern:*

Be it known that I, ANDREW W. SHIRK, a citizen of the United States, residing at Dayton, in the county of Montgomery and State of Ohio, have invented certain new and useful Improvements in Sewer-Agitators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in sewer cleaners or means for loosening the sewage and other accumulations such as the roots of trees, etc., from the inner surfaces of sewer pipes.

The object of the invention is to provide a device of this type which may be effectively operated in both directions in a sewer pipe and one with a capacity for not only loosening the solid accumulations in the pipe but also a capacity for cutting or disconnecting roots which often find ingress to sewer pipes through defective joints.

The essential characteristic of the invention consists in forming the cutter plates or plate with the ends tapering in opposite directions from the central or body portion and in providing the tapered edges with teeth formed and arranged to cut through the obstructions as the device is drawn lengthwise through the sewer pipe, as will hereinafter be more fully described in connection with the drawings hereto annexed. In these drawings, two forms of agitators or cutters are shown. In both, however, the essential features, as outlined above, are present.

Figure 1:
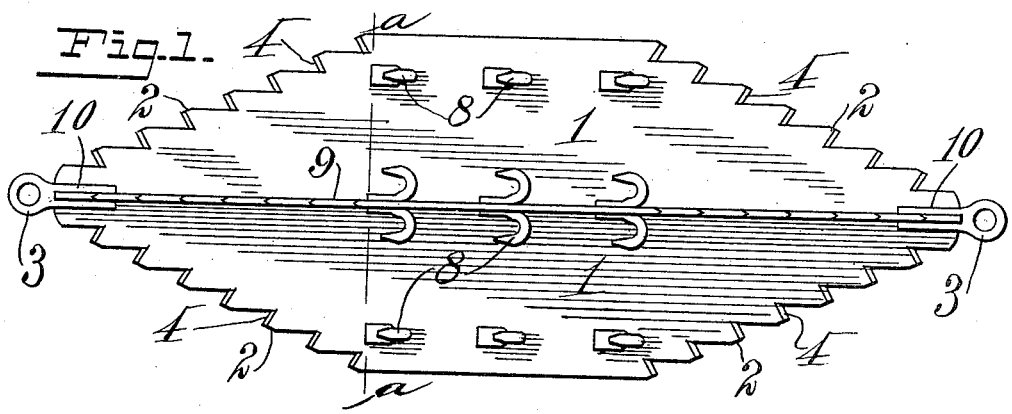
Figure 2:
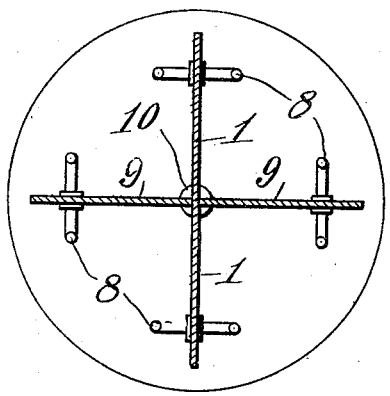

Figure 1 is a horizontal side elevation of my improved sewer agitator; Fig. 2 is a sectional view on the line *a—a* of Fig. 1.

Referring more particularly to the drawings, 1 and 9 designate similar flat cutter plates or blades two of which, as shown in Figs. 1 and 2, are united longitudinally at right angles to provide four disintegrating or cutting edges 2. Each of such plates or blades is tapered on both edges from the widest diameter to the ends thereof and said tapered parts are provided with cutting teeth 4 constructed and arranged to provide a series of cutting edges throughout the extent of the tapered edges. It will be noted that the cutting edges or teeth 4 incline forwardly or in the direction of the travel of the device. When the device, as shown in Fig. 1, is forcibly drawn through a sewer, the said cutting teeth or edges 4 have a capacity for cutting through solid accumulations of matter, such as the roots of trees which often find their way into and clog up and seriously impair the efficiency of a sewer. Secured to the ends of the device are eyepieces 3 the shanks 10 of which are bifurcated to straddle the ends of the blades. Means such as chains or wire cables (not shown) are attached to these eye-members and operated by a windlass through a manhole. These features are so commonly understood as to render unnecessary any illustration thereof or further description. Owing to the form and construction of the blades or plates 1, it is apparent that the device may be drawn through a sewer in either direction.

The plates or blades 1 are provided with grappling hooks 8 which are made fast thereto and adapted to tear apart any knotted or tangled roots. The said hooks are necessarily placed on the blades or plates 1 a suitable distance in from the edges of said plates or blades in order that the device may meet with no permanent obstruction such as an unalined end of a sewer pipe through which it is being drawn.

Having described my invention, I claim—

1. A sewer-cleaning device, comprising a plurality of blades extending at right angles to each other, the longitudinal edges of said blades being tapered inwardly toward the ends, and said tapered edges being provided with individual cutting edges which incline forwardly, said device having attachment means on the ends thereof, substantially as specified.

2. In a sewer-cleaning device, the combination of a plurality of oblong plates united throughout their longitudinal axes and providing a series of blades extending at right angles, the longitudinal edges of said blades being tapered inwardly to their ends and said tapered edges being provided with cutting edges lying in angles to the plane of said blades, and grappling hooks arranged on said blades, substantially as specified.

In testimony whereof I affix my signature, in presence of two witnesses.

ANDREW W. SHIRK.

Witnesses:
 MATTHEW SIEBLER,
 MELLIE GALLOWAY.

Copies of this patent may be obtained for five cents each, by addressing the "Commissioner of Patents, Washington, D. C."